(12) United States Patent
Johannes et al.

(10) Patent No.: US 8,109,078 B2
(45) Date of Patent: Feb. 7, 2012

(54) METHOD OF OPERATING A SYNGAS GENERATOR

(76) Inventors: Erik Paul Johannes, Burnaby (CA); Xuantian Li, Vancouver (CA); Richard Allan Sederquist, Middletown, CT (US)

( * ) Notice: Subject to any disclaimer, the term of this patent is extended or adjusted under 35 U.S.C. 154(b) by 863 days.

(21) Appl. No.: 12/033,610

(22) Filed: Feb. 19, 2008

(65) Prior Publication Data

US 2008/0209891 A1 Sep. 4, 2008

Related U.S. Application Data

(60) Provisional application No. 60/890,600, filed on Feb. 19, 2007.

(51) Int. Cl.
*F01N 3/00* (2006.01)
(52) U.S. Cl. ............... 60/286; 60/274; 60/285; 60/295; 60/301; 60/303
(58) Field of Classification Search ............ 60/274, 60/278, 285, 286, 297, 301, 303; 48/197 R, 48/198.7, 198.8
See application file for complete search history.

(56) References Cited

U.S. PATENT DOCUMENTS

| | | | |
|---|---|---|---|
| 4,026,823 A | 5/1977 | Van Hook et al. | |
| 6,391,484 B1 | 5/2002 | Keskula et al. | |
| 6,521,204 B1 | 2/2003 | Borup et al. | |
| 6,670,061 B2 | 12/2003 | Iio et al. | |
| 6,702,991 B1 | 3/2004 | Smaling et al. | |
| 6,718,753 B2 * | 4/2004 | Bromberg et al. ............... 60/275 |
| 6,758,035 B2 | 7/2004 | Smaling | |
| 6,763,657 B2 | 7/2004 | Wachi et al. | |
| 6,811,578 B2 | 11/2004 | Kunitake et al. | |
| 6,823,662 B1 * | 11/2004 | Yamamoto et al. ............. 60/286 |
| 6,851,398 B2 | 2/2005 | Taylor et al. | |
| 6,869,456 B2 | 3/2005 | Salemi et al. | |
| 6,964,156 B2 | 11/2005 | Liu et al. | |
| 6,997,142 B2 * | 2/2006 | Wakao et al. ..................... 123/3 |
| 7,014,930 B2 | 3/2006 | Daniel et al. | |

(Continued)

FOREIGN PATENT DOCUMENTS

EP 1211394 A2 6/2002

OTHER PUBLICATIONS

Office Action mailed Dec. 14, 2009 from the Canadian Intellectual Property Office in Canadian Patent Application No. 2,678,213.

(Continued)

*Primary Examiner* — Binh Q Tran
(74) *Attorney, Agent, or Firm* — McAndrews, Held & Malloy, Ltd.

(57) ABSTRACT

A method of operating a syngas generator within a desired temperature range, despite a need for intermittent syngas output, involves switching between operating the syngas generator in a rich mode and a lean mode. Operation of the syngas generator in both the rich mode and the lean mode sustains the operating temperature of the syngas generator within that desired temperature range, particularly for non-catalytic reactors. The method of switching from the lean mode to the rich mode of operation can include decreasing the oxygen-to-carbon ratio of reactants supplied to the syngas generator. The flow rate of one or more of the reactant streams supplied to the syngas generator can be actively controlled in order to switch operation of the syngas generator between the rich and lean modes.

35 Claims, 5 Drawing Sheets

U.S. PATENT DOCUMENTS

| | | | |
|---|---|---|---|
| 7,040,084 B2 * | 5/2006 | Ament | 60/274 |
| 7,082,753 B2 | 8/2006 | Dalla Betta et al. | |
| 7,086,853 B2 | 8/2006 | Kamijo | |
| 7,101,531 B2 | 9/2006 | Kamijo | |
| 7,163,566 B2 | 1/2007 | Doling et al. | |
| 7,165,393 B2 | 1/2007 | Betta et al. | |
| 7,181,906 B2 * | 2/2007 | Dalla Betta et al. | 60/286 |
| 7,244,281 B2 | 7/2007 | Crane, Jr. et al. | |
| 7,267,699 B2 | 9/2007 | Kamijo | |
| 7,610,752 B2 | 11/2009 | Dalla Betta et al. | |
| 7,628,009 B2 * | 12/2009 | Hu et al. | 60/285 |
| 2003/0143445 A1 | 7/2003 | Daniel et al. | |
| 2006/0048502 A1 | 3/2006 | Washington et al. | |
| 2006/0174608 A1 | 8/2006 | Hu et al. | |
| 2007/0028602 A1 | 2/2007 | Dalla Betta et al. | |
| 2007/0180769 A1 | 8/2007 | Bonadies et al. | |
| 2007/0256407 A1 | 11/2007 | Reuter | |
| 2008/0022661 A1 | 1/2008 | Yan | |
| 2009/0071420 A1 | 3/2009 | Huber et al. | |

OTHER PUBLICATIONS

A Response to the Office Action mailed Apr. 9, 2010.

A Notice of Allowance from the Canadian Intellectual Property Office in Canadian Patent Application No. 2,678,213 mailed May 13, 2010.

* cited by examiner

METHOD OF OPERATING A SYNGAS GENERATOR

CROSS-REFERENCE TO RELATED APPLICATION(S)

This application is related to and claims priority benefits from U.S. Provisional Patent Application Ser. No. 60/890,600, entitled "Method of Operating a Syngas Generator", filed on Feb. 19, 2007, which is hereby incorporated by reference in its entirety.

FIELD OF THE INVENTION

The present invention relates to a method of operating a syngas generator. The method is especially useful in applications where the need for syngas is intermittent or fluctuating, and where the syngas generator is non-catalytic. The method relates particularly to the operation of a syngas generator in an internal combustion engine emissions reduction exhaust after-treatment system, where the engine can be part of a vehicular or non-vehicular system. There can be other uses for the syngas stream within the overall system.

BACKGROUND OF THE INVENTION

A syngas generator is a device than can convert a fuel into a gas stream containing hydrogen ($H_2$) and carbon monoxide (CO), commonly referred to as syngas. The syngas generator can be employed in an internal combustion engine exhaust after-treatment system used for emissions reduction. In this application the product syngas from the generator can be used to regenerate and/or heat one or more exhaust after-treatment devices such as Lean NOx Traps (LNT), Diesel Particulate Filters (DPF), and Diesel Oxidation Catalysts (DOC). There can also be other uses for syngas within the engine system.

For mobile applications, size, weight, reactant supply, durability and operating characteristics are some of the considerations when selecting the fuel conversion method. Partial oxidation reforming (POX) or auto thermal reforming (ATR) methods are both suited for mobile applications. An advantage of POX or ATR types of syngas generator is that the engine fuel and engine exhaust stream can be used as the reactants for the fuel conversion process, eliminating the need to carry or create an additional on-board reactant supply. POX or ATR syngas generators can be non-catalytic or catalytic. The non-catalytic type of POX or ATR syngas generators offer additional advantages such as increased durability (no catalyst to poison), reduced capital cost, fast response time, greater operating temperature range and the ability to withstand thermal cycles with larger magnitudes. The engine exhaust stream contains oxygen ($O_2$), water ($H_2O$), carbon dioxide ($CO_2$) and heat, which can be utilized in the production of syngas. However in this situation, the reactant supply and composition will vary over the operating duty cycle of the engine, and this can present some challenges as described below. Furthermore, the pressure of the engine exhaust stream is generally limited.

Reforming of hydrocarbon fuel, especially heavy hydrocarbons (such as diesel), can be difficult due to the range of components that make up the fuel. These various components can react at different temperatures and rates. Inadequate vaporization and mixing of the fuel with the engine exhaust stream can lead to localized fuel-rich conditions, resulting in the formation of carbon within the syngas generator. Chemical decomposition of the hydrocarbon fuel can also lead to formation of carbon and residues, and can start at temperatures as low as 160° C. Carbon formation and removal are affected by the oxygen-to-carbon (O/C) and steam-to-carbon (S/C) ratios in the syngas generator. As mentioned above, the use of the engine exhaust stream as a reactant in the syngas generator imposes inherent supply and operational challenges. Operating with low and varying concentrations of oxygen, water, carbon dioxide and heat, at the same time as endeavoring to maintain appropriate oxygen-to-carbon (O/C) and steam-to-carbon (S/C) ratios to prevent detrimental carbon build-up over the operating duty cycle of the engine, is a challenge.

While many have attempted to eliminate or minimize carbon formation, practically there is an inevitable tendency for carbon to form during the conversion process of the fuel into syngas. Over time, carbon accumulation can impede the flow of gases, increase the pressure drop across the syngas generator, and reduce the durability of the syngas generator. Large accumulations of carbon also have the potential to create excessive amounts of heat that can damage the syngas generator if the carbon is oxidized in a short period of time. The carbon can also travel downstream of the syngas generator, increasing the back pressure of the engine exhaust and adversely affecting exhaust after-treatment devices, for example, by blocking catalyst and adsorbent reactive sites.

A non-catalytic syngas generator converts the fuel into syngas by cracking and reforming the fuel. This is an endothermic reaction and occurs at temperatures typically in the range of 600°-1400° C. The reaction temperature is dependent on various things such as: the hydrocarbon fuel being used, fuel conversion efficiency, and the degree of coke or soot (carbon) formation. A portion of the fuel can be combusted with oxygen in the engine exhaust stream to produce the required heat for the reaction. The O/C ratio of the fuel and engine exhaust mixture will affect the amount of heat produced and the temperature of the syngas generator. At these elevated temperatures, high thermal stresses can be created during the thermal cycling of the syngas generator. Thermal stresses can reduce the durability of the syngas generator over its lifetime.

Prior approaches to produce syngas include the use of catalytic POX or ATR fuel processors. The shortcomings of catalytic fuel processors include:

(1) Sintering of the catalyst if the catalyst is exposed to elevated temperatures. This can reduce the fuel conversion efficiency.
(2) Fatiguing of catalyst support materials during large thermal cycles. Small magnitude thermal cycles are desired, for example, less than a 100° C. range, to promote material durability.
(3) High capital cost resulting from the high cost of the catalyst material.
(4) Low durability as the catalyst is susceptible to poisoning by contaminants contained in the reactants.

When syngas is used in the regeneration or heating of exhaust after-treatment devices in an internal combustion engine system, typically the requirement for syngas fluctuates or is intermittent. The requirement for syngas can be dependent, for example, on the engine exhaust emission output, the capacity of the after-treatment devices, the regeneration cycle of the after-treatment devices, the temperature of the exhaust gas and the heat loss of the exhaust system. When syngas is required, the syngas generator must typically be at or above a certain temperature in order to generate the required amount of syngas rapidly (typically within a few seconds) when it is needed. It is not practical to repeatedly start up and shut down the syngas generator. This would result in the thermal cycling of the syngas generator, which can reduce the durability and reliability of the device, as well as causing delays in the production of syngas. Furthermore, dynamically responsive start up and shut down of the syngas generator generally requires a fairly complex control system which can increase the cost of the system.

Prior approaches to the challenge of keeping the syngas generator warm during times when there is little or no requirement for syngas in the system have involved:

(1) Operating the syngas generator in a continuous, syngas-generating steady state mode, but discarding or diverting excess syngas to the inlet of the engine or to other syngas-consuming devices in the system. Discarding excess syngas results in a significant fuel penalty that will typically cause the overall efficiency of the engine system to be unacceptably low, and the operating cost to be high. Adding syngas to the fuel intake of an internal combustion engine utilizes the heating value in the syngas and can reduce NOx emissions. However, this approach can alter the combustion characteristics of the engine, requiring extensive testing prior to approval for use and warranty by the engine manufacturers.

(2) Reducing the supply of reactants (for example, fuel and engine exhaust) to the syngas generator so that it remains sufficiently warm that it can restart within a few seconds, but in the meantime produces smaller quantities of syngas. This approach increases the complexity of the reactant control which increases the cost of the exhaust aftertreatment system.

(3) Using a "mini" syngas generator (such as a catalytic partial oxidizer) to feed the main syngas generator sufficiently to keep it warm, so it can be rapidly restarted. In this approach, reduced amounts of reactants are mixed and applied to a continuously-running smaller syngas generator, the output of which is applied to the main syngas generator that supplies syngas to the after-treatment system. The output of the smaller syngas generator provides heat as well as an easily lighted fuel that can be used to maintain the main syngas generator at a near-operating temperature. However, this requires a second fuel processor device in the system which adds to the system complexity and cost.

Prior approaches to maintain the operating temperature of a catalytic type fuel processor within a desired range have involved supplying fuel to the fuel processor in a pulsed, discontinuous manner (time based) to provide alternating rich and lean periods, even during syngas production. During the lean periods, the fuel flow can be shut-off or set at a sub-stoichiometric (stoichiometry<1) flow rate. During the rich periods, an excess amount of fuel (stoichiometry>1) is supplied. Alternatively, the fuel processor can be supplied with fuel in essentially a continuous manner but only to a portion of the catalyst bed at a given time (spatial based) forming alternating rich and lean zones. At a given time, the portion of the catalyst bed receiving the fuel will be a rich zone, while the portion of the catalyst bed that receives no or a limited amount of fuel (with a stoichiometry of less than 1), will be a lean zone. A negligible or a limited amount of heat is produced under lean conditions which limits the temperature rise of the catalysts and fuel processor. The alternating cycle (fuel flow rate, duration and frequency) between the rich and lean periods or zones are selected to maintain the magnitude of the thermal cycles at a desired level.

The shortcoming of a catalytic type fuel processor and the above approach to maintain the desired operating temperature of the fuel processor can include:

(1) High frequency cycling of the fuel supply is required, for example, less than or equal to 10 seconds to prevent the temperature of the catalyst from moving outside a desired range and to reduce the magnitude of the thermal cycles of the catalyst.

(2) Higher operating fuel penalty.

(3) Increased component and control complexity and cost.

The present approach overcomes at least some of the shortcomings of these prior approaches and offers additional advantages.

SUMMARY OF THE INVENTION

A method of operating a syngas generator within a temperature range comprises switching between operating the syngas generator in a rich mode and a lean mode, wherein operation in both the rich mode and the lean mode sustains the operating temperature of the syngas generator within the temperature range. The method of switching from the lean mode to the rich mode of operation can comprise decreasing the O/C ratio of reactants supplied to the syngas generator. The flow rate of both of the reactant streams supplied to the syngas generator can be actively controlled in order to switch operation of the syngas generator between the rich and lean modes; however it is preferable to actively control the supply of just one of the reactants.

The syngas generator is switched between the lean mode and rich mode depending on the syngas output requirement from the generator (that is, the need for syngas in the system). For example, the method can comprise switching the syngas generator from the rich mode to the lean mode of operation when syngas output requirement is reduced below some first pre-determined threshold level. This can be when just a small quantity of syngas is required or when essentially no syngas is required. Similarly the method can comprise switching from the lean mode to the rich mode of operation when syngas output requirement is increased above a second pre-determined threshold level. The first and second threshold levels can be the same or different from one another.

The syngas generator can be operated in a rich mode for prolonged periods (for example, minutes or hours) if there is a sustained demand for syngas. Occasional brief excursions into a lean mode may be needed in order to mitigate carbon build-up, but in a non-catalytic syngas generator the temperature will typically remain sufficiently stable during a prolonged rich mode of operation without a need to switch to a lean mode of operation during syngas production for temperature control purposes. Similarly if the demand for syngas remains low or negligible for a prolonged period, the syngas generator can typically be operated in a lean mode at a stable temperature without the need to cycle to a rich mode for temperature control purposes.

In other embodiments the syngas is switched between operating in a rich mode and operating in a lean mode depending on the carbon removal requirement in the syngas generator or elsewhere in the system. In some cases the need for carbon removal is indicated by monitoring a pressure drop in the system, for example across the syngas generator.

In one example of an application where the need for syngas can fluctuate or be intermittent, the syngas generator is used to supply syngas to at least an exhaust after-treatment device in a combustion engine system, when it is operating in the rich mode. In this case the syngas generator can be operated essentially continuously while the combustion engine is operating. The fuel supplied to the syngas generator can conveniently comprise the same fuel that is used to operate the combustion engine, and/or the oxidant supplied to the syngas generator can comprise at least a portion of the internal combustion engine exhaust stream. In some embodiments the mass flow rate of the fuel supplied to the syngas generator is actively controlled in order to switch operation of the syngas generator between the rich and lean modes, while the supply of the engine exhaust stream to the syngas generator is passively controlled. The mass flow rate of the fuel supplied to the syngas generator can be actively controlled in an open or closed loop control regime, as described in more detail below. In other embodiments, the mass flow rate of both the fuel and engine exhaust stream supplied to the syngas generator is actively controlled in order to switch operation of the syngas generator between the rich and lean modes, but this is generally less preferred.

In some embodiments, the mass flow rate of the fuel supplied to the syngas generator is constant or varies linearly over the engine operating duty in at least one of the lean and rich modes of operation.

In certain embodiments of the above described method the desired operating temperature range for the syngas generator is between about 1000° C. and about 1200° C., and the method is used to sustain the temperature within this range, while the syngas output can be changed.

The desired atomic oxygen to carbon (O/C) ratio and atomic steam to carbon (S/C) ratio will depend on the specific system and application in which the method is used. In certain system embodiments, when in rich mode, the syngas generator is desirably operated with an atomic oxygen to carbon (O/C) ratio between 1.6 and 2.3, and/or with an atomic steam-to-carbon (S/C) ratio between 0.10 and 0.90.

In embodiments of an apparatus, a syngas generator has an associated control system that is configured to maintain the operating temperature of the syngas generator within a temperature range by switching between a rich mode and a lean mode of operation. The control system can be configured to switch the syngas generator from the lean mode to the rich mode of operation by decreasing the O/C ratio of reactants supplied to the syngas generator. This can be accomplished by adjusting the flow rate of one or both of the reactant streams supplied to the syngas generator in order to switch operation of the syngas generator between the rich and lean modes. The control system is configured to switch the syngas generator from the rich mode to the lean mode of operation depending on the syngas output requirement. For example, the controller can cause the syngas generator to switch from the rich mode to the lean mode of operation when the syngas output requirement is reduced below some pre-determined threshold level. This can be when just a small quantity of syngas is required or when essentially no syngas is required. Similarly the controller can cause the syngas generator to switch from the lean mode to the rich mode of operation when syngas output requirement is increased above a pre-determined threshold level. The control system can also be configured to switch the syngas generator from the rich mode to the lean mode of operation depending also upon the need for carbon removal.

In other system embodiments, an engine system comprises an internal combustion engine, at least one exhaust after-treatment device (such as, for example, a lean NOx trap or a diesel particulate filter) and a syngas generator and associated control system. The syngas generator is connected to periodically supply syngas to the at least one exhaust after-treatment device, and has an associated control system that is configured to maintain the operating temperature of the syngas generator within a temperature range by switching between a rich mode and a lean mode of operation.

In the above methods and apparatuses, the syngas generator can be of any suitable type, depending on the application, but is preferably a non-catalytic syngas generator. For example, it could be a partial oxidizer or an autothermal reformer.

BRIEF DESCRIPTION OF THE DRAWING(S)

DETAILED DESCRIPTION OF PREFERRED EMBODIMENT(S)

In preferred embodiments of the present method and apparatus for operating and controlling a syngas generator, during the normal operating process the syngas generator is operated within and switched between at least two modes of operation, namely a lean mode and a rich mode. The syngas generator is operated and maintained within a desired reaction temperature range in both modes. Generally, the syngas generator temperature refers to the reaction temperature within the syngas generator. The operating mode can be selected, for example, depending on the syngas output requirement, and/or the need for carbon removal in the syngas generator and/or other factors.

Figure 1:
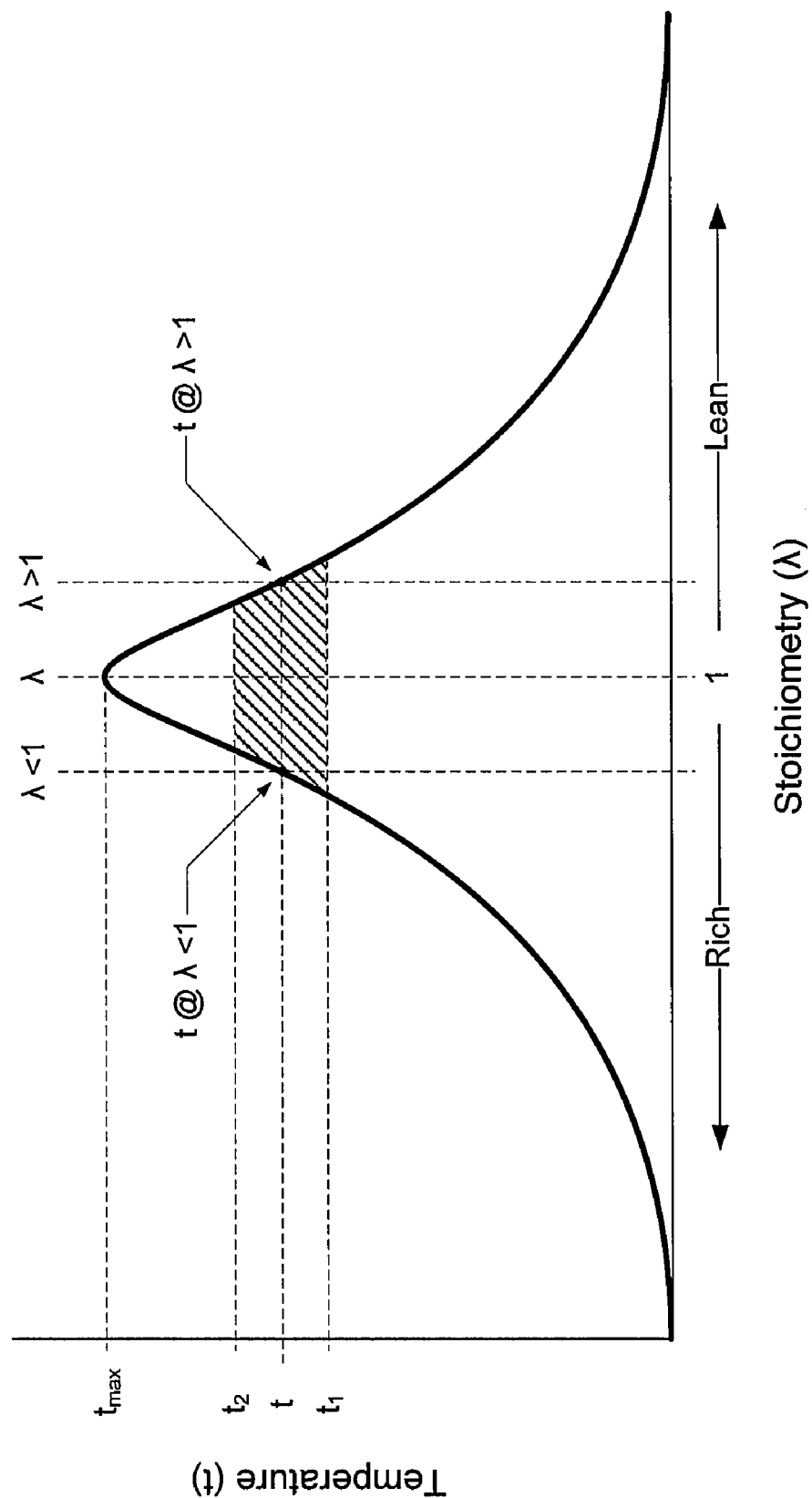
FIG. 1 is a graph (not necessarily to scale) illustrating the change in operating temperature of a syngas generator as the ratio of fuel and oxidant supplied to the syngas generator (or the oxygen-carbon ratio) is varied.

FIG. 1 is a simplified graphical illustration showing the change in operating temperature of a syngas generator as the ratio of oxidant and fuel supplied to the syngas generator (or the oxygen-carbon ratio) is varied. The curve is not necessarily to scale, nor necessarily symmetrical or of the profile shown. When the oxidant and fuel are supplied to the syngas generator in so-called "stoichiometric" amounts—that is, so that both reactants are essentially entirely consumed in combustion processes—the operating temperature of the syngas generator will typically be at or close to its maximum. This is illustrated in FIG. 1 as the temperature $t_{max}$ which occurs at a stoichiometry ($\lambda$) of 1. If excess fuel is supplied then the syngas generator will be operating in a "rich" mode, with essentially all of the oxidant being consumed, and the operating temperature will fall below $t_{max}$. Similarly if excess oxidant is supplied then the syngas generator will be operating in a "lean" mode, with essentially all of the fuel being consumed, and the operating temperature will also fall below $t_{max}$. The desired operating temperature range of the syngas generator is generally within a range below $t_{max}$, which is typically a trade-off between a number of factors including the fuel conversion efficiency, the prevention of carbon formation and material durability. In FIG. 1 the desired temperature range is shown as a range between $t_1$ and $t_2$. FIG. 1 illustrates that a particular operating temperature, for example "t", can be achieved in either the rich ($\lambda<1$) or lean ($\lambda>1$) mode of operation.

When syngas is required, the syngas generator can be operated in a rich mode (with at least a slight excess of fuel) to produce the desired syngas output, and stay within the desired temperature range. One prior approach (described above) for controlling the temperature of a catalytic type of syngas generator, even during syngas production, involves supplying the fuel in a discontinuously manner (intermittently) or a spatially manner (only to a portion of the catalyst of the syngas generator). However, in a catalytic type of fuel processor the magnitude of the desired temperature range is small, for example, 30° C. This prior approach requires frequent cycling of the fuel supply, for example, less than or equal to 10 seconds, to prevent the temperature range from exceeding a desired range. This can result in an increase to the operating fuel penalty and an increase to the complexity and cost of the components and software.

In some applications the syngas output requirement fluctuates and is sometimes reduced or falls to zero, but it is desirable to sustain the temperature of the syngas generator within the desired temperature range so that it can rapidly respond to an increase in syngas output requirement, and so that thermal cycling is reduced. One prior approach (described above) would be to reduce the supply of both reactants to the syngas generator so that it continues to operate and stays sufficiently warm, but in the meantime produces smaller quantities of syngas. However, this prior approach does not involve shifting the reactant stoichiometry ($\lambda$) of oxidant to fuel from below one to above one. In embodiments of the present approach, the syngas output is substantially reduced or in preferred embodiments is stopped and the reactant stoichiometry ($\lambda$) is adjusted so that the operating temperature is still within the desired temperature range ($t_1$-$t_2$), but operation is switched to the other side of the curve shown in FIG. 1, so that the syngas generator is operating in a so-called lean mode, with at least a slight excess of oxidant. This deliberate switch to a lean mode of operation offers significant advantages. It reduces fuel consumption, creates an oxidizing environment that will oxidize and convert the coke or soot (carbon) that has formed in the syngas generator, and stabilizes the flame or combustion process. Also, since syngas is generally not produced in this lean mode it does not have to be used elsewhere in the system. Furthermore, non-catalytic syngas generators can operate over a larger temperature range, for example 900°-1300° C., without adversely affecting flame stability, response time for syngas production, and material durability. A minimum temperature threshold value to allow rapid production of syngas has been demonstrated to be about 500°-600° C. A non-catalytic syngas generator can operate in a lean mode over an extended period of time (essentially continuously), without having to be cycled frequently between rich and lean modes or to frequently switch the stoichiometry of the reactants in order to maintain the temperature of the syngas generator within a desired range.

In applications in which the syngas generator is part of a combustion engine system and is used, for example, to supply syngas for regenerating or heating exhaust after-treatment devices, the syngas generator is operated substantially continuously when the internal combustion engine is in operation. The operating temperature of the syngas generator is maintained within a desired range. This reduces the quantity and magnitude of thermal cycles and thermal stresses, increasing the durability of the syngas generator. In preferred embodiments, the syngas generator has two modes of operation as described above, a lean mode and a rich mode. During these modes of operation, the O/C ratio is adjusted to achieve or maintain the syngas generator within the desired operating temperature range, without producing detrimental amounts of carbon (coke or soot). The O/C ratio can be adjusted by actively controlling or metering the mass flow of at least one of the syngas generator reactant streams to sustain the desired syngas generator temperature.

In such applications exhaust stream from the combustion engine exhaust stream can be conveniently supplied to the syngas generator along with the same fuel that is supplied to the engine, for conversion to syngas. During the rich mode of operation, the syngas generator is supplied with the appropriate amounts of engine exhaust and fuel (O/C ratio) to heat the syngas generator to the desired operating temperature and to produce the syngas output required to regenerate and/or heat the exhaust after-treatment devices. The exhaust gas and fuel are supplied so that the majority of the oxygen in the exhaust gas and a portion of the fuel are consumed during the catalytic oxidation or combustion process, creating the desired temperature in the syngas generator. The excess fuel, heated to the reforming temperature, is then cracked and reformed into syngas. In some situations small residual amounts of oxygen may be present in the syngas stream (for example, approximately 1%), despite the rich mode of operation. The presence of this oxygen can actually reduce the tendency for carbon formation. Optionally, air and/or water can be supplied to the syngas generator with or without engine exhaust.

When syngas is not required for regeneration and/or heating, the syngas generator is switched over to the lean mode of operation. This approach addresses shortcomings of conventional syngas generator operation methods. During the lean mode of operation, the syngas generator is supplied with the appropriate amounts of engine exhaust and fuel (O/C ratio) to sufficiently heat and maintain the syngas generator at the desired temperature and to create an oxidizing atmosphere. Only enough fuel to heat or maintain the syngas generator is required, which is significantly less fuel than is consumed when producing syngas. The majority of the fuel and a portion of the oxygen are consumed during the oxidation or combustion process, maintaining the temperature and creating an oxidizing environment, but reducing the amount of fuel consumed by the syngas generator. A non-catalytic syngas generator can be operated at one lean mode setting over an extended period of time (continuously), while maintaining its temperature, without the requirement for frequent adjustments to the stoichiometry or O/C ratio of the reactants. In preferred embodiments, essentially no syngas is produced in this mode of operation.

The oxidizing environment created during the lean mode of operation will oxidize and convert the coke or soot (carbon) that has formed and accumulated into carbon monoxide (CO) or carbon dioxide ($CO_2$). This "self-cleaning" carbon removal feature can be programmed into the syngas generator operation as required. In some situations, even where the need for syngas is not intermittent it could be advantageous to temporarily stop or reduce syngas production briefly (for example, for 5 seconds or shorter) and switch to the lean mode, for example, to remove carbon build-up from within the syngas generator, or to stabilize the combustion process.

Figure 2:
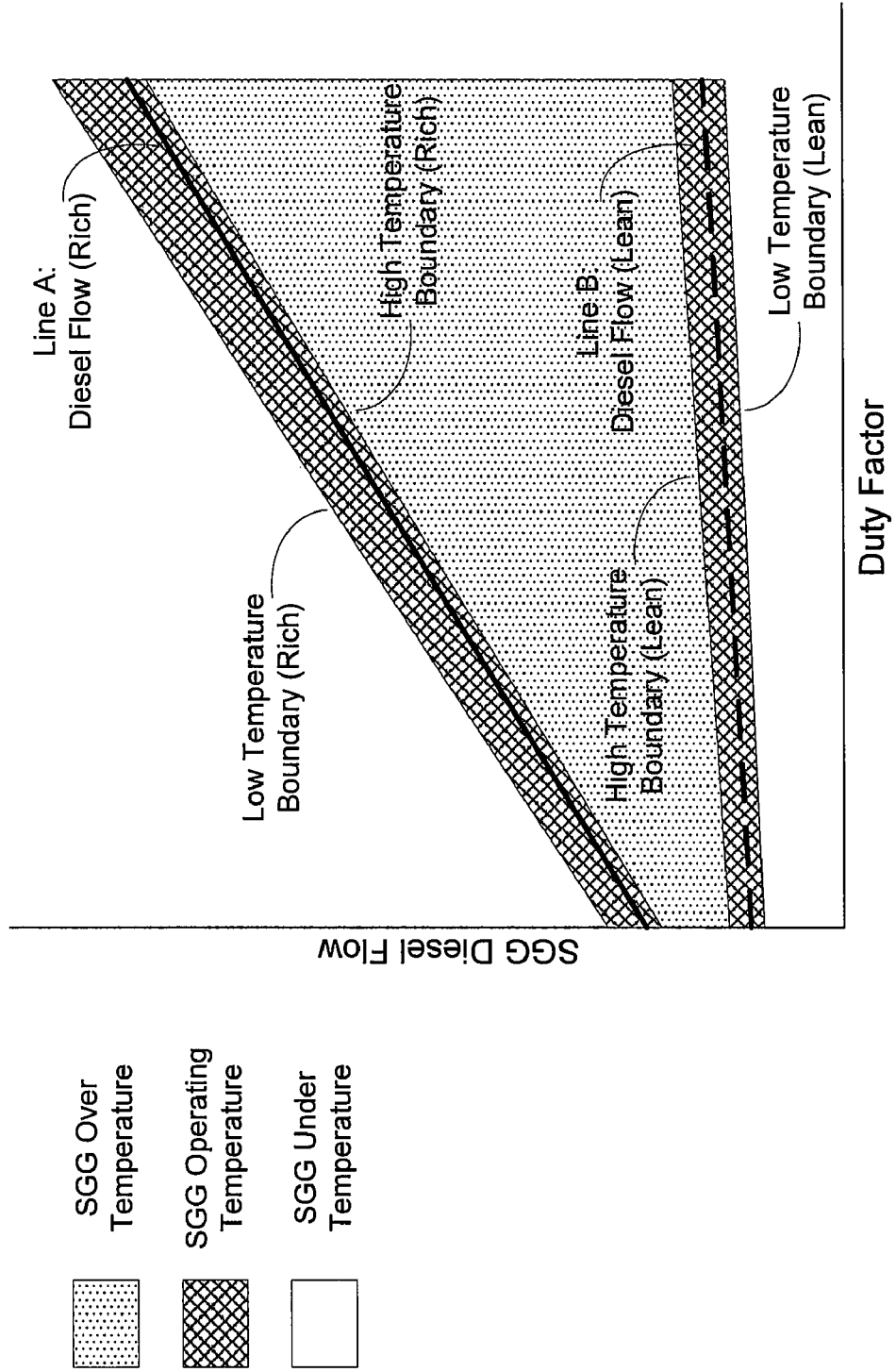
FIG. 2 is a graph illustrating syngas generator diesel flow rates for the rich and lean operating modes over a range of diesel engine duty factors.

FIG. 2 illustrates the diesel flow rates to the syngas generator for rich and lean operating modes of a syngas generator in a diesel engine system over a range of diesel engine duty factors. These plots are superimposed over the syngas generator operating temperature isotherm. The x-axis represents the diesel engine duty factor. The duty factor is a function of the operating condition of the engine for example, speed of engine, oxygen concentration of engine exhaust stream (syngas generator oxidant reactant stream), and pressure of engine exhaust stream (syngas generator oxidant reactant stream). The y-axis represents the mass flow rate of diesel fuel to the syngas generator. The cross-hatched area of the temperature map represents the desired syngas generator operating temperature range, for purposes of this example 1000°-1200° C. The non-shaded area represents temperatures of less than or equal to 1000° C. or an "under temperature" condition. The boundary between the cross-hatched and non-shaded areas represents the 1000° C. isotherm. The dotted area of the temperature map represents temperatures of greater than or equal to 1200° C. or an "over temperature" condition. The boundary between the cross-hatched and dotted areas represents the 1200° C. isotherm.

In FIG. 2, the dotted area (greater than or equal to 1200° C.) is surrounded by the cross-hatched area (1000°-1200° C.). The cross-hatched area above the dotted area represents a higher syngas generator fuel mass flow rate or fuel-rich conditions. The cross-hatched area below the dotted area represents a lower syngas generator fuel mass flow rate or fuel-lean conditions. FIG. 2 illustrates that, for a given engine duty, it is possible to operate in the desired cross-hatched temperature range in either the fuel-rich mode or fuel-lean mode by adjusting the mass flow of the syngas generator diesel inlet stream. In FIG. 2, Line A represents the syngas generator diesel mass flow rate, over the engine duty factor, in the fuel-rich mode. Line B represents the syngas generator diesel mass flow rate, over the engine duty factor, in the fuel-lean mode. In the example of FIG. 2, it is possible to stay within the desired syngas generator operating temperature range while varying the diesel mass flow rate substantially linearly over the engine operating duty in both the rich mode and lean mode. Generally the control will be simpler and the system will be more dynamically responsive to rapid load changes and transients if the temperature profile allows the fuel mass flow rate (or at least one of the reactant mass flow rates) to be held substantially constant over the entire engine duty within each of the lean and rich operating modes. This can allow a simple switch between two predetermined reactant flow rates to effect to the switch from lean to rich mode and back.

The syngas generator temperature profile, represented in FIG. 2 as the cross-hatched and dotted areas, can be modified for a given engine system by adjusting various design and/or operating parameters.

The reactant mass flow rates are controlled to vary the composition of the reactant mixture supplied to the syngas generator. In some prior approaches, both reactants are independently metered with variable flow control devices for example, a variable flow control valve, a variable speed fixed displacement pump or compressor. These variable flow control devices can be actively controlled by a controller and corresponding sensors placed in the system. This approach provides variable flow control of both reactants but is complex, expensive and less durable. Another prior approach uses fixed flow controls for each reactant, for example a fixed orifice with a 2-way (on or off) valve. One or more control devices can be used for each reactant to vary the flow rate of that reactant, for example a pair of fixed orifices with different dimensions, each with an on-off valve, a controller to activate the opening and closing of the valve for each orifice depending on the flow rate requirement. This approach has limited flow control flexibility. In some embodiments of the present approach, one reactant is supplied via a passive and fixed flow control device, while supply of the other reactant is actively controlled by a variable flow control device. The flow rate of the reactant that is supplied via the passive control device can vary, but the variation is essentially uncontrolled. The actively controlled reactant can be controlled in either an open loop or closed loop regime. For example, in an open loop regime the flow rate of the reactant can be controlled based on pre-programmed values that in some embodiments could be time-based; in a closed loop regime the flow rate of the reactant can be controlled and dynamically adjusted in response to some monitored parameter in the system. This approach, with active control of only one reactant, offers the advantages of variable flow control, rapid response times, reduced system complexity and reduced cost. For example the engine exhaust or oxidant can be supplied via a fixed orifice device, while the fuel is metered by a variable speed fixed displacement pump controlled by a controller and optionally corresponding sensors. An example of a suitable passive and fixed flow control device via which engine exhaust gas can be supplied to a syngas generator is a critical flow venturi, as described in U.S. Provisional Patent Application No. 60/864,240, entitled "Syngas Generator with Metering, Mixing and Flashback Arresting Device", filed on Nov. 3, 2006.

The output requirement from the syngas generator is dependent on the needs of the various exhaust after-treatment devices or other syngas-consuming devices that are supplied by the syngas generator. In an exhaust after-treatment system the requirement for syngas will typically vary with, and be dependent upon, the engine duty. The oxidant (engine exhaust gas) supply to the syngas generator will also vary predictably with the engine duty. The O/C ratio and therefore the syngas output can thus be controlled for a given engine duty by adjusting the fuel flow rate to predetermined values in rich mode. Furthermore, the syngas generator can be switched from rich to lean mode at a given engine duty simply by changing the fuel flow rate to the lean mode value for that engine operating duty.

In variations to the operating methods described above, the ratio of the duration or time in the rich and lean modes and/or the equivalence ratio (ratio between the actual amount of fuel and the theoretical stoichiometric amount of fuel which would be required to fully react with the oxygen present in a gas mixture) can be varied to affect the average syngas output rate while maintaining the temperature and flame stability of the syngas generator.

The limited reactant supply and the syngas requirement for lean $NO_x$ trap regeneration over the operating duty cycle of the engine affects the atomic oxygen-to-carbon (O/C) and steam-to-carbon (S/C) ratios in the syngas generator. The O/C and S/C ratios affect the carbon formation, carbon conversion or removal, and the syngas generator operating temperature. Table 1 provides examples of atomic O/C and S/C ratios, with a syngas generator operating temperature in the range of 1000°-1200° C. over the engine operating duty during the rich mode of operation. These values are particular to a specific engine, syngas generator and lean $NO_x$ trap exhaust after-treatment system and will be different for different systems.

TABLE 1

Atomic Oxygen-to-Carbon (O/C) and Steam-to-Carbon (S/C) Ratios with the Syngas Generator at 1000°-1200° C. for a Specific Engine System

| | Engine Operating Condition (duty) | | | | |
|---|---|---|---|---|---|
| | Idle | 22.5% | 50% | 75% | 100% |
| O/C ratio | 1.7 | 1.8 | 2 | 2.1 | 2.1 |
| S/C ratio | 0.11 | 0.39 | 0.55 | 0.68 | 0.81 |

Figure 3:
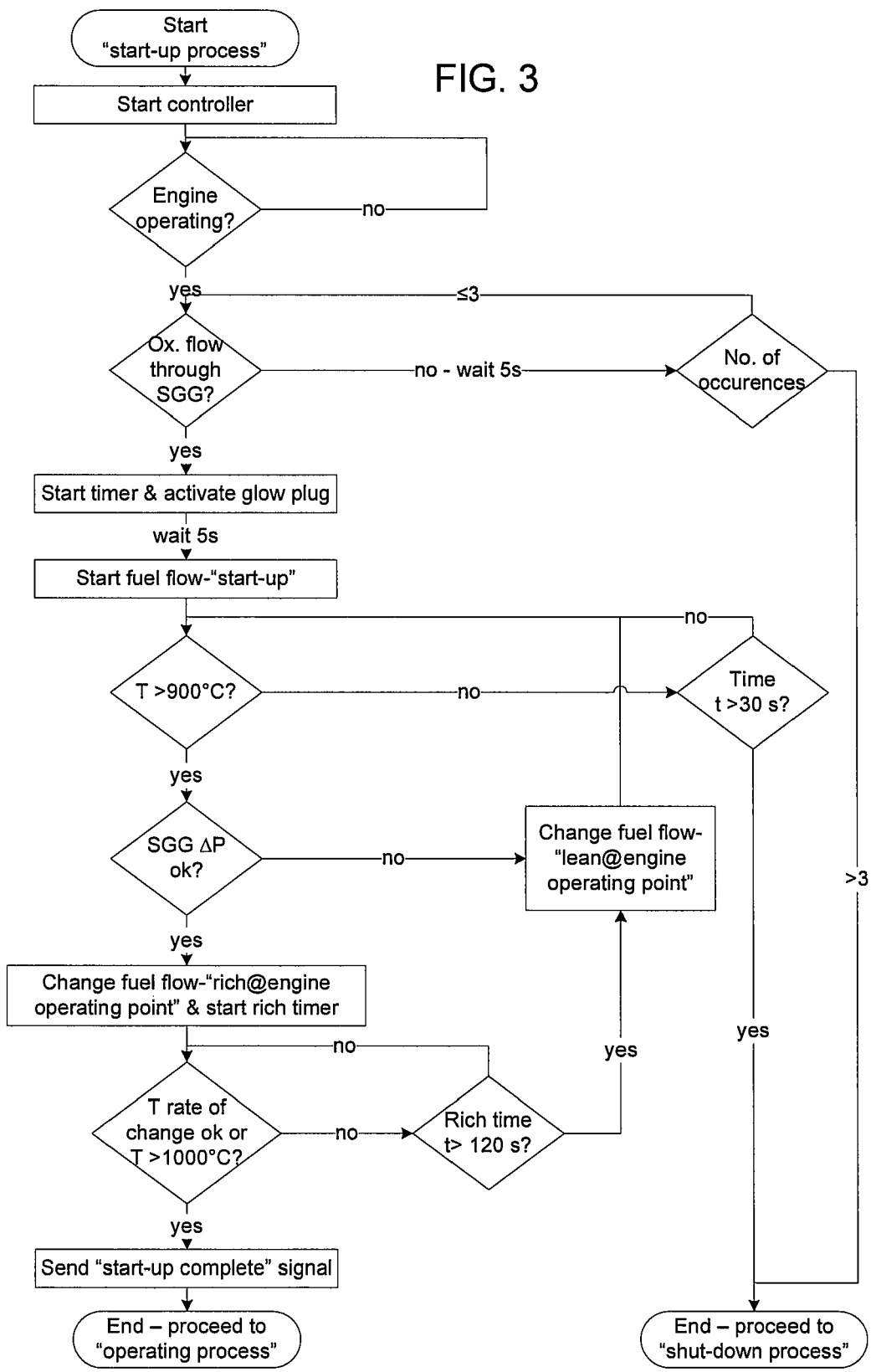
FIG. 3 is a flow chart of an example of a start-up process for a syngas generator.
Figure 4:
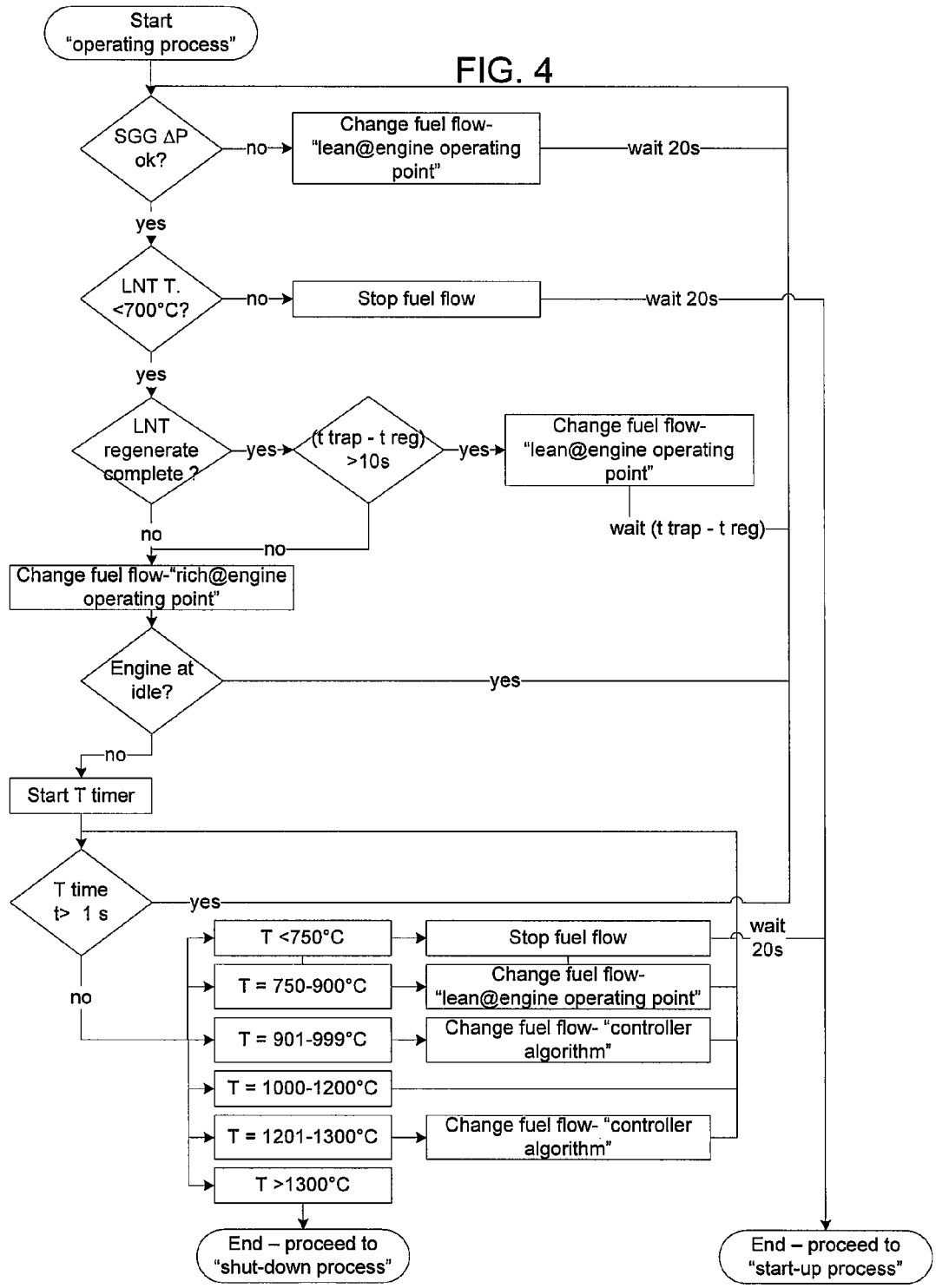
FIG. 4 is a flow chart of an example of an operating process for a syngas generator.
Figure 5:
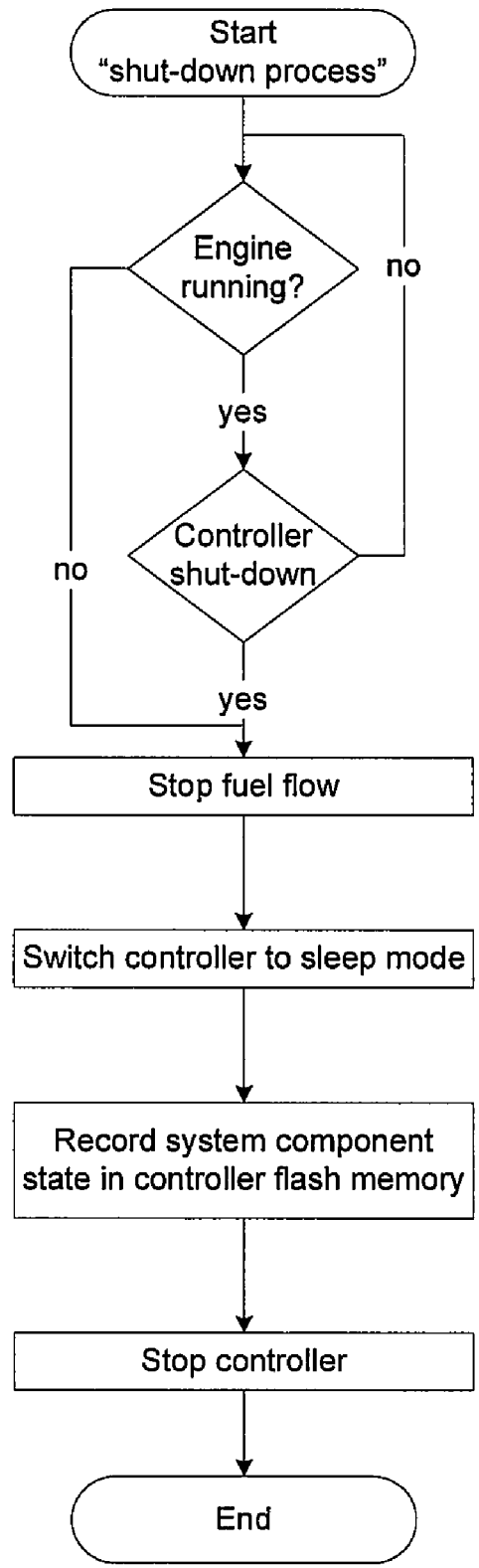
FIG. 5 is a flow chart of an example of a shut-down process for a syngas generator.

FIGS. 3, 4 and 5 are flow charts illustrating examples of start-up, operating and shut-down processes for a syngas generator that is used to supply syngas to regenerate a lean $NO_x$ trap (LNT) in an exhaust after-treatment system. In this example, the oxidant flow rate to the syngas generator varies but is controlled passively with a fixed orifice device, while the fuel flow rate is actively controlled with a variable speed fixed displacement pump, based on the engine operating point, syngas generator temperature, syngas generator pressure differential, and LNT temperature. The fuel flow rate is adjusted to:

(1) vary the syngas output to match the demand based on the current engine operating point and the LNT regeneration status;
(2) switch between the lean and rich modes of operation, as required depending on the syngas output demand or carbon removal requirement;
(3) vary the syngas generator's reaction temperature rate change, as discussed below in connection with FIG. 4.

The syngas generator can be equipped with pressure and temperature sensors, while the LNT is equipped with a temperature sensor. A controller is used to control the syngas generator based on pre-programmed control logic. For a specific engine and exhaust after-treatment system, engine exhaust parameters are determined over a number of operating points covering the typical range of the engine duty. At each operating point, the engine exhaust output, after-treatment regeneration requirement and syngas requirement can be different. Also at each operating point, the syngas generator will be able to be operated in one or more modes, such as lean and rich modes. The rich mode will be active when regeneration of the exhaust after-treatment system is required. The lean mode will be active when regeneration is not required, or if carbon or soot removal from the syngas generator is required or if the combustion process is unstable. The control logic and signals are determined and programmed into the controller for each operating point. Additional sensors and control devices, for example $NO_x$ sensors, sulfur sensors, pressure transducers, thermocouples and flow control or diverter valves, can be used to actively sense and control devices in the exhaust after-treatment system.

FIG. 3 illustrates a start-up process for the syngas generator (SGG). The flow chart starts with the engine turned on prior to starting the SGG, and ends with the controller proceeding to either an operating or a shut-down process. Upon the SGG start-up process, the oxidant flow to the SGG is detected, a timer is started and the glow plug is activated. After a pre-set time, the fuel flow rate is set to a "start-up" value and started. A temperature within the SGG and a pressure drop across the SGG are then measured. If the temperature is not above the desired threshold level after a pre-set time then the system shuts down. If the pressure drop value is not within the desired range, the fuel flow rate is changed to "lean at the current engine operating point". This creates an oxidizing atmosphere which can oxidize carbon that may have formed in the SGG and caused the undesirable pressure drop. When the measured temperature and pressure drop values are within the desired range, the fuel flow rate is changed to a value corresponding to the "rich mode at the current engine operating point". Another temperature reading is taken and the temperature rate change within the SGG is calculated.

If, after a pre-determined time period the rate of temperature change or SGG temperature are below the desired values, the fuel flow is changed to the "lean at the current engine operating point" flow rate. This can help stabilize the combustion process. The temperature measurement process is then repeated. If the temperature rate change or SGG temperature meets the desired value, a start-up process completion signal is sent to the controller and the start-up process is complete, and the operating process ensues. In certain circumstances, as illustrated, if the start-up process does not proceed as it should, the start-up process is terminated and the system is shut down.

FIG. 4 illustrates an operating process for the syngas generator (SGG). The flow chart starts with the completion of the start-up process and the fuel flow set at a rate corresponding to the "rich mode at the current engine operating point". The chart ends with the controller proceeding to either the start-up or shut-down process. A pressure drop across the SGG is measured and if the value is above the desired value, the fuel flow is changed to the "lean mode at the current engine operating point" and held for a desired time interval prior to repeating the process step. This process will generally oxidize carbon that may have formed in the SGG. If the pressure drop is within the desired range, a LNT temperature is measured.

If the LNT temperature is above the desired temperature, fuel flow to the SGG is terminated for a desired time interval prior to the controller proceeding to the SGG start-up process. This step, whereby the supply of syngas to the LNT is stopped, reduces the potential for over-heating and sintering of the LNT catalysts and adsorbents. If the LNT temperature is below the threshold temperature, then the LNT regeneration duration is measured by the controller. If the duration exceeds the desired regeneration time period, indicating that the LNT regeneration is complete, the controller calculates the trapping time remaining until the next regeneration step will commence ($t_{trap}-t_{reg}$).

If the time remaining to the next regeneration step is above a desired value the fuel flow is changed to the "lean mode at the current engine operating point" for a desired time interval prior to repeating the start of the operating process. This reduces the syngas output and reduces fuel consumption but maintains the temperature of the SGG. If the LNT regeneration duration has not been met or the time remaining until the next regeneration step is below a desired time, the fuel flow is remains set at, or is changed to, the "rich mode at the current engine operating point". The controller determines if the engine is at an idle condition.

If the engine is at idle, the operating process is repeated. If the engine is not at idle, the controller starts a temperature timer. If the temperature timer process is below a desired time interval, a SGG temperature is measured and the controller proceeds based on the temperature measurement. If the temperature is below a desired threshold value, for example, less than 750° C., fuel flow to the SGG is terminated, and after a desired time interval the controller proceeds to the SGG start-up process. If the temperature is within a specific range but below the desired SGG operating temperature, for example 750°-900° C., the fuel flow is changed to the "lean mode at the current engine operating point" and the temperature timer process is repeated. If the temperature is within another higher specific range but also below the desired SGG operating temperature, for example 901°-999° C., the fuel flow is changed to a "controller algorithm" based flow rate and the temperature timer process is repeated.

The controller algorithm-based flow rate attempts to increase the rate at which the SGG temperature increases by adjusting the fuel flow rate. If the temperature is within a desired SGG operating temperature range, for example, 1000°-1200° C., the temperature timer process is repeated. If the temperature is within another specific range above the desired SGG operating temperature, for example, 1201°-1300° C., the fuel flow is changed to a "controller algorithm" based flow rate and the temperature timer process is repeated. In this case the controller algorithm based flow rate attempts to reduce rate of the SGG temperature increase by adjusting the fuel flow rate. If the temperature is above a threshold maximum SGG operating temperature, for example, less than 1300° C., the controller proceeds to the shut-down process. If the temperature timer process is above a desired time interval the operating process is repeated.

FIG. 5 illustrates a shut-down process for the syngas generator (SGG). The flow chart starts with the SGG in operation and ends with the SGG shutting down and the controlled stopped. The shut-down process can be started with the engine being shut off or by the controller. The fuel supply is switched off, shutting down the syngas generator. System information is recorded by the controller before it is switched off.

The fuel conversion reaction temperatures typically occur between 500°-1500° C. In certain embodiments, particularly in engine exhaust after-treatment systems incorporating a non-catalytic, autothermal type of syngas generator, the preferred operating temperature range for the syngas generator is 10000-1200° C. The method can be applied in a variety of other types of syngas generators, including steam reformers (SR), partial oxidation (POX) reactors or autothermal reformers (ATR), but is particularly suitable in situations where the reactor is non-catalytic. In engine system applications, the internal combustion engine can be a compression ignition or spark ignition type of engine. The method can be applied in various stationary and on-board systems that incorporate a syngas generator.

The present method of operating and controlling a syngas generator can be used for syngas generators in applications other than engine exhaust after-treatment devices, such as, for example, fuel cell auxiliary power units or in a HCCl diesel engine.

Suitable fuels that are converted to syngas (and optionally also used in the engine if present) can be, for example, gasoline, diesel, kerosene, natural gas, liquefied petroleum gas (LPG), methanol, ethanol, propane, naphtha, other hydrocarbons, alcohols or similar fuels.

The fuel flow rates can be adjusted to allow for more than one temperature point, with the corresponding rich and lean modes. There can be more than two operating modes. The fuel flow rates can be constant, vary linearly or vary in some other way over the engine duty.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A method of operating a syngas generator, said method comprising switching between operating in a rich mode and operating in a lean mode, wherein operation in said rich mode and in said lean mode each independently sustains the operating temperature of said syngas generator within the same desired temperature range, and wherein operation is switched between said rich mode and said lean mode at least according to the syngas output requirement from said syngas generator.

2. The method of claim 1, wherein switching from said lean mode to said rich mode of operation comprises decreasing the atomic oxygen-to-carbon (O/C) ratio of reactants supplied to said syngas generator.

3. The method of claim 1, wherein the flow rate of at least one reactant stream supplied to said syngas generator is actively controlled in order to switch operation of said syngas generator between said rich and lean modes.

4. The method of claim 1, wherein the flow rate of both a fuel stream and an oxidant stream supplied to said syngas generator is actively controlled in order to switch operation of said syngas generator between said rich and lean modes.

5. The method of claim 1, wherein said method comprises switching from said rich mode to said lean mode of operation when syngas output requirement is reduced below a first threshold level.

6. The method of claim 5, wherein said method comprises switching from said lean mode to said rich mode of operation when syngas output requirement is increased above a second threshold level.

7. The method of claim 5, wherein when said syngas output requirement is below said first threshold level said syngas generator is operated only in said lean mode.

8. The method of claim 7, wherein said syngas generator is operated in rich mode with an atomic steam-to-carbon (S/C) ratio between 0.10 and 0.90.

9. The method of claim 1, wherein said syngas generator supplies syngas to at least one exhaust after-treatment device in a combustion engine system, when operating in said rich mode.

10. The method of claim 9, wherein said syngas generator is operated essentially continuously while said combustion engine is operating.

11. The method of claim 9, wherein said syngas generator is supplied with a fuel comprising the same fuel that is used to operate said combustion engine, and said syngas generator is supplied with an oxidant comprising at least a portion of an internal combustion engine exhaust stream.

12. The method of claim 11, wherein the mass flow rate of said fuel supplied to said syngas generator is actively controlled in order to switch operation of said syngas generator between said rich and lean modes, while the supply of said engine exhaust stream to said syngas generator is passively controlled.

13. The method of claim 12, wherein the mass flow rate of said fuel supplied to said syngas generator is actively controlled in an open loop control regime.

14. The method of claim 11, wherein the mass flow rate of said fuel supplied to said syngas generator is actively controlled in a closed loop control regime.

15. The method of claim 11, wherein the mass flow rate of both said fuel and engine exhaust stream supplied to said syngas generator is actively controlled in order to switch operation of said syngas generator between said rich and lean modes.

16. The method of claim 9, wherein said temperature range is between about 500° C. and 1400° C.

17. The method of claim 9, wherein said temperature range is between about 1000° C. and 1200° C.

18. The method of claim 9, wherein said syngas generator is at least one of a non-catalytic partial oxidizer and a non-catalytic autothermal reformer.

19. The method of claim 9, wherein said syngas generator is operated in rich mode with an 0/C ratio between 1.6 and 2.3.

20. The method of claim 9, wherein said syngas generator is further switched between operating in a rich mode and operating in a lean mode depending on the carbon removal requirement in the syngas generator.

21. The method of claim 9, wherein said syngas generator is switched between operating in a rich mode and operating in a lean mode depending on a monitored pressure drop value.

22. The method of claim 1, wherein the mass flow rate of a fuel stream supplied to said syngas generator is constant over the engine operating duty in at least one of said lean and rich modes of operation.

23. The method of claim 1, wherein the mass flow rate of a fuel stream supplied to said syngas generator varies linearly over the engine operating duty in at least one of said lean and rich modes of operation.

24. The method of claim 1, wherein said temperature range is between about 500° C. and 1400° C.

25. The method of claim 1, wherein said temperature range is between about 1000° C. and 1200° C.

26. The method of claim 1, wherein said syngas generator is at least one of a non-catalytic partial oxidizer and a non-catalytic autothermal reformer.

27. The method of claim 1, wherein said syngas generator is at least one of a non-catalytic partial oxidizer and a non-catalytic autothermal reformer.

28. The method of claim 1, wherein said syngas generator is operated in rich mode with an 0/C ratio between 1.6 and 2.3.

29. The method of claim 1, wherein said syngas generator is operated in rich mode with an atomic steam-to-carbon (S/C) ratio between 0.10 and 0.90.

30. The method of claim 1, wherein said syngas generator is further switched between operating in a rich mode and operating in a lean mode depending on the carbon removal requirement in the syngas generator.

31. The method of claim 1, wherein said syngas generator is switched between operating in a rich mode and operating in a lean mode depending on a monitored pressure drop value.

32. The method of claim 1, wherein during operation in said lean mode fuel is supplied in an essentially continuous manner to all portions of said syngas generator.

33. The method of claim 1, wherein during operation in said lean mode, the equivalence ratio is set at an essentially constant value.

34. The method of claim 1, wherein during operation in said rich mode, the equivalence ratio is set at an essentially constant value.

35. A method of operating a syngas generator, said method comprising switching between operating in a rich mode and operating in a lean mode depending on the carbon removal requirement in the syngas generator, wherein operation in said rich mode and in said lean mode each independently sustains the operating temperature of the syngas generator within the same desired temperature range.

* * * * *